Patented Jan. 9, 1940

2,186,729

UNITED STATES PATENT OFFICE 2,186,729

METHOD OF MAKING REMEDY CONTAINERS FOR INTRODUCING INTO CAVITIES OF THE BODY

Karl Wilhelm Schmidt, Nuremberg, Germany

No Drawing. Application January 23, 1937, Serial No. 122,075. In Germany September 12, 1936

2 Claims. (Cl. 167—64)

This invention relates to the production of capsules, pessaries, or other remedy containers for introduction into cavities of the body, where the container is dissolved under the influence of the heat and moisture of the body.

It is already known to make the remedy container chiefly of urea for this purpose. It has now been found that by using grape sugar or milk sugar in the production of the remedy container, the latter acquires the property of itself accelerating the healing action since grape sugar or milk sugar stimulates the growth of bacteria and fission fungi peculiar to the body, and these overrun the disease germs.

Consequently, according to the present invention the urea serving for the making of the remedy container has admixed therewith a quantity of grape sugar or milk sugar corresponding to the intended action. The remedy container can also be made only of grape sugar or milk sugar, the urea being dispensed with.

In many applications a lower solubility on the part of the remedy container is desirable, e. g., always when the remedy is to act for a prolonged time on the affected organ.

For this purpose, according to the present invention, a small quantity of tragacanth is admixed with the urea in the production of the container. Tragacanth has the property of swelling under the action of moisture. In the present case the swelling is brought about by the moisture in the cavity of the body. Because of the swelling of the tragacanth the dissolution of the remedy container is retarded.

In carrying out the invention, the procedure is, for example, as follows:

Example 1

First of all an aqueous solution of vegetable mucus, e. g., of agar agar, is formed. The urea powder and powdery grape sugar or milk sugar is admixed with this solution. The proportion of grape sugar or milk sugar amounts to about 20% of the quantity of urea. The introduction of the urea powder and of the grape or milk sugar powder into vegetable mucus solution takes place with heating of this solution to 80–90° C.

The warm mixture is cast into moulds and after cooling down and setting yields the capsule-shaped or pessary-shaped container. The moulded piece is withdrawn in the moist state and then dried, for example in a vacuum drying chamber.

Example 2

In the production of remedy containers without urea, one starts out from dry grape or milk sugar powder. This powder is worked up either in the dry state or after moistening with water in such a way that, using milk sugar with addition of a small quantity, e. g., 5%, of binder, it is pressed in moulds under comparatively high pressure, about 30–40 tons. The moulded piece already represents the finished container.

Example 3

The method of Example 2 yields remedy containers which are difficultly soluble in the cavity of the body. The remedy containers made according to Example 1 are substantially more readily soluble. In order to diminish their solubility, some tragacanth is added to the mixture of urea with grape or milk sugar during the production, e. g., in a quantity of 5% referred to the total substance.

Example 4

A pulpy mixture of tragacanth and water has dry urea powder admixed therewith so that a stiff pulp is formed. The mixture ratio of tragacanth to urea is about 1:20. The dough is dried, the mass solidifying to a hard body. This body is now dry ground. The powder produced is moistened with water and pressed into moulds. The moulded piece is dried, and then represents the finished remedy container.

I claim:

1. The method of making a remedy container, which consists in introducing into an aqueous solution of agar agar, urea powder and powdery grape or milk sugar in the proportion of 20% of sugar to the quantity of urea during the heating of this solution at 80–90° C., and adding thereto tragacanth in the quantity of 5% of the total substance, then casting the same into molds having a capsule or pessary shape having an open end adapted to hold a medicament, cooling and setting the same in the molds, withdrawing the molded piece in the moist state, and then drying the same.

2. The method of making capsule and pessary remedy containers which comprises mixing together urea powder and about 20 per cent by weight of powdered sugar based on the weight of the urea said sugar being selected from a group consisting of grape and milk sugar; in an aqueous solution, with a small amount of added agar agar and tragacanth as binder, heating to form a moldable mixture and then molding the same into shape.

KARL WILHELM SCHMIDT.